US012645079B1

(12) United States Patent
Cote et al.

(10) Patent No.: US 12,645,079 B1
(45) Date of Patent: Jun. 2, 2026

(54) BINOCULAR DISPARITY AND BORESITE ERROR SENSING FROM LIGHT FIELD

(71) Applicant: META PLATFORMS TECHNOLOGIES, LLC, Menlo Park, CA (US)

(72) Inventors: Jasmin Cote, Quebec (CA); Tamer Elazhary, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 672 days.

(21) Appl. No.: 18/162,462

(22) Filed: Jan. 31, 2023

Related U.S. Application Data

(60) Provisional application No. 63/306,303, filed on Feb. 3, 2022.

(51) Int. Cl.
| | |
|---|---|
| G02B 27/01 | (2006.01) |
| G01M 11/02 | (2006.01) |
| G02B 21/00 | (2006.01) |
| G06T 19/00 | (2011.01) |
| G09G 3/00 | (2006.01) |
| H04N 9/31 | (2006.01) |

(52) U.S. Cl.
CPC ..... *G02B 27/0172* (2013.01); *G01M 11/0221* (2013.01); *G02B 21/0036* (2013.01); *G06T 19/006* (2013.01); *G09G 3/003* (2013.01); *G02B 2027/0132* (2013.01); *G02B 2027/014* (2013.01); *G02B 2027/0178* (2013.01); *G02B 2027/0187* (2013.01); *G06T 2210/22* (2013.01); *G09G 2354/00* (2013.01); *G09G 2360/145* (2013.01); *H04N 9/3194* (2013.01)

(58) Field of Classification Search
CPC ........ G02B 2027/0129; G02B 27/0179; G02B 2027/0187; G02B 2027/0198
See application file for complete search history.

(56) References Cited

U.S. PATENT DOCUMENTS

| | | | | | |
|---|---|---|---|---|---|
| 11,202,043 | B1* | 12/2021 | Elazhary | ........... | G02B 27/0176 |
| 2022/0377312 | A1* | 11/2022 | Samples | .............. | H04N 13/344 |

OTHER PUBLICATIONS

Jayasuriya S., "Plenoptic Imaging and Vision Using Angle Sensitive Pixels," Cornell University Dissertation, [Retrieved on Jan. 2017], 182 pages, Retrieved from the Internet: URL: https://web.asu.edu/sites/default/files/imaging-lyceum/files/jayasuriya_thesis.pdf.
Wang A., et al., "Angle-Sensitive Pixels: a New Paradigm for Low-Power, Low-Cost 2D and 3D Sensing," Stereoscopic Displays and Applications XXIII, Feb. 21, 2012, vol. 8288, 14 pages.
Wang A., et al., "Light Field Image Sensors Based on the Talbot Effect," Applied Optics, Nov. 1, 2009, vol. 48, No. 21, pp. 5897-5905.
Wang A., et al., "Phase-Based 3D Optical Flow Sensors for Motion Detection," Sensors, Oct. 28, 2011, 4 pages.
(Continued)

*Primary Examiner* — Alexander P Gross
(74) *Attorney, Agent, or Firm* — Greenberg Traurig, LLP

(57) ABSTRACT

Various embodiments set forth a sensing device. In some embodiments, the sensing device includes a first angle sensor configured to detect a first portion of light projected toward a left eye. In addition, the sensing device includes a second angle sensor configured to detect a second portion of light projected toward a right eye.

20 Claims, 11 Drawing Sheets

(56) References Cited

OTHER PUBLICATIONS

Wikipedia., "Angle-Sensitive Pixel," retrieved on Jan. 31, 2023, 1 page, Retrieved from the Internet: URL: https://en.m.wikipedia.org/wiki/Angle-sensitive_pixel.

Wikipedia., "Fresnel Diffraction," retrieved on Jan. 31, 2023, 5 pages, Retrieved from the Internet: URL: https://en.m.wikipedia.org/wiki/Fresnel_diffraction.

Wikipedia., "Talbot Effect," retrieved on Jan. 31, 2023, 3 pages, Retrieved from the Internet: URL: https://en.m.wikipedia.org/wiki/Talbot_effect.

* cited by examiner

162

Frame
175

Display
164

Frame
175

Display
Block
185

Display
164

Display
Assembly
180

Eye
170

Eyebox
165

900

902$_i$  904$_i$  906$_i$

910

912$_i$  914$_i$  916$_i$

BINOCULAR DISPARITY AND BORESITE ERROR SENSING FROM LIGHT FIELD

CROSS-REFERENCE TO RELATED APPLICATIONS

This application claims priority benefit of the United States Provisional Patent Application titled, "TECHNIQUES FOR DETECTING LIGHT FIELD DISPARITIES," filed on Feb. 3, 2022 and having Ser. No. 63/306,303. The subject matter of this related application is hereby incorporated herein by reference.

BACKGROUND

Technical Field

The present disclosure relates generally to angle sensing systems, and more specifically, to binocular disparity and boresite error sensing from light fields.

Background

Description of Related Art

Augmented reality (AR) systems have been used to present views of physical, real-world environments that are augmented with computer-generated input. For example, a head-mounted display (HMD) can implement an AR system.

To produce a desired 3D effect, an AR system needs to project left- and right-eye images in the correct directions towards the left and right eyes of a user, respectively. The projected directions of the left- and right-eye images can become misaligned due to mechanically and/or thermally induced stresses that cause components of the AR system to move relative to each other. For example, an HMD can experience mechanical stresses when being worn on the head of a user, causing components of the HMD to tilt, bend, or otherwise move relative to one another. As another example, temperature changes can cause light projection assemblies in an AR system to move relative to one another.

One approach for detecting misalignments between the projected directions of left- and right-eye images in an AR system uses an imaging system, which can include optics and an imaging device, to capture a portion of light associated with the left- and right-eye images that are projected towards the left and right eyes. Image processing is applied to the captured light to detect angular shifts between the left- and right-eye images.

One drawback of the above approach for detecting misalignments between the projected directions of left- and right-eye images in an AR system is that the imaging system is oftentimes relatively large in size. Further, components of the imaging system, and other components within the AR system, need to be carefully aligned relative to each other in order to capture the portion of light that is projected towards the left and right eyes. In addition, the imaging system that is used to capture the portion of light, and the image processing that is applied to process the captured light, can consume a significant amount of power.

As the foregoing illustrates, what is needed in the art are more efficient techniques for sensing misalignments between the projected directions of left- and right-eye images in an AR system.

SUMMARY

One embodiment of the present disclosure sets forth a sensing device. The sensing device includes a first angle sensor configured to detect a first portion of light projected toward a left eye. In addition, the sensing device includes a second angle sensor configured to detect a second portion of light projected toward a right eye.

Another embodiment of the present disclosure sets forth a display system. The display system includes a first projector and a second projector. The display system further includes a first angle sensor configured to detect a first portion of light that is emitted by the first projector and projected toward a left eye. In addition, the display system includes a second angle sensor configured to detect a second portion of light that is emitted by the second projector and projected toward a right eye.

Another embodiment of the present disclosure sets forth a method. The method includes determining, based on one or more signals from one or more first angle sensors, a first projection angle at which light is projected toward a left eye. The method also includes determining, based on one or more signals from one or more second angle sensors, a second projection angle at which light is projected toward a right eye. The method further includes computing a relative difference between the first projection angle and the second projection angle. In addition, the method includes modifying at least one of the first projection angle or the second projection angle based on the relative difference.

One advantage of the techniques disclosed herein relative to the prior art is the disclosed AR (and other extended reality) systems include angle sensors that can be smaller in size than the imaging systems that are used to detect misalignments between the projected directions of left- and right-eye images in conventional AR systems. The disclosed AR systems also include fewer components that need to be aligned relative to each other than conventional AR systems. Further, the angle sensors in the disclosed AR systems can require less power to operate than the imaging systems in conventional AR systems, and angle sensor data acquired by the disclosed AR systems can also be processed faster, while consuming less power, than image data acquired by conventional AR systems. In addition, the detectors, such as photodiodes, in the disclosed AR systems can operate at higher speeds and provide better signal-to-noise ratios than the image sensors in conventional AR systems. These technical advantages represent one or more technological advancements over prior art approaches.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

Figure 1A:
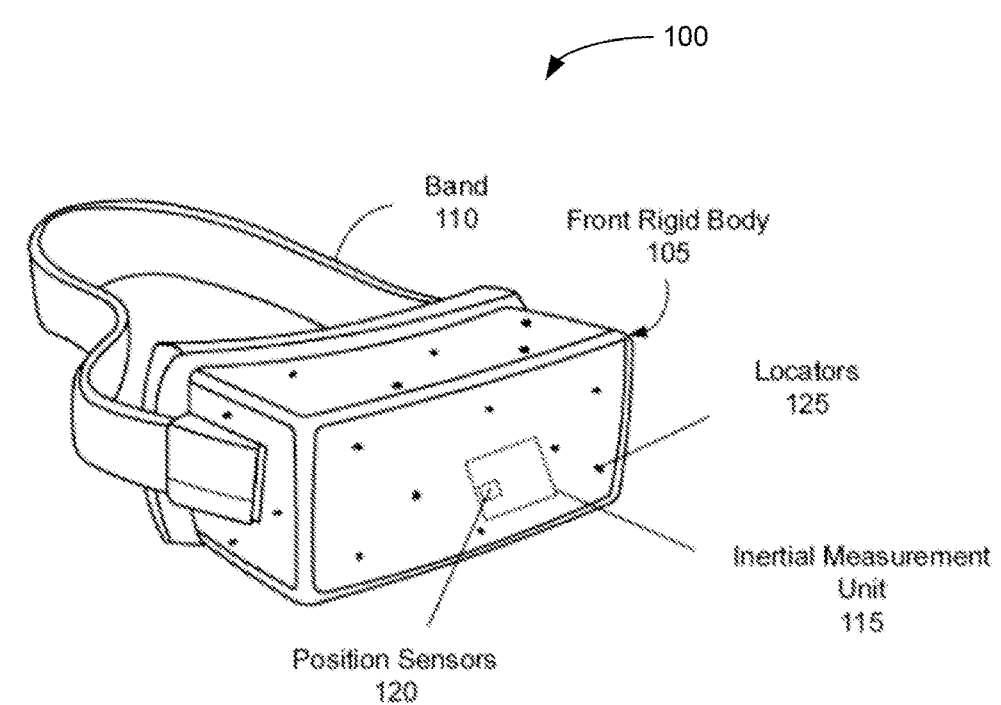
FIG. 1A is a diagram of a near eye display, according to various embodiments.

In the following description, numerous specific details are set forth to provide a more thorough understanding of the various embodiments. However, it is apparent to one of skill in the art that the disclosed concepts may be practiced without one or more of these specific details.

Configuration Overview

One or more embodiments disclosed herein relate to binocular disparity and bore sight error sensing from light fields. In some embodiments, an augmented reality (AR) system includes one or more angle sensors that sense the directions that light associated with left- and right-eye images are being projected towards the left and right eyes of a user, respectively. In some embodiments, each angle sensor includes an array of one or more angle sensors, such as an array of angle-sensitive pixels (ASPs). In such cases, each angle sensor in the array of angle sensor(s) can include an input periodic structure, a substrate, an analyzer periodic structure, and a detector. To detect binocular disparity and bore sight errors between the left- and right-eye images projected by the AR system, a relative difference is computed between the projected directions of the left- and right-eye images that are measured using the angle sensor(s). A correction can be applied to the projected directions of subsequent left- and/or right-eye images based on the relative difference.

Embodiments of the disclosure may also include or be implemented in conjunction with an artificial reality system. Artificial reality is a form of reality that has been adjusted in some manner before presentation to a user, which may include, for example, a virtual reality (VR) system, an AR system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) connected to a host computer system, a standalone HMD, a mobile device or computing system, or any other hardware platform capable of providing artificial reality content to one or more viewers.

Embodiments of the disclosure may also include or be implemented in conjunction with an artificial reality system. Artificial reality is a form of reality that has been adjusted in some manner before presentation to a user, which may include, for example, a VR system, an AR system, a MR system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a HMD connected to a host computer system, a standalone HMD, a mobile device or computing system, or any other hardware platform capable of providing artificial reality content to one or more viewers.

System Overview

FIG. 1A is a wire diagram of a near eye display (NED) 100, according to various embodiments. As shown, the NED 100 includes a front rigid body 105 and a band 110. The front rigid body 105 includes one or more electronic display elements of an electronic display (not shown), an inertial measurement unit (IMU) 115, one or more position sensors 120, and locators 125. As illustrated in FIG. 1A, position sensors 120 are located within the IMU 115, and neither the IMU 115 nor the position sensors 120 are visible to the user. In various embodiments, where the NED 100 acts as an augmented reality (AR) or mixed reality (MR) device, portions of the NED 100 and/or its internal components are at least partially transparent.

Figure 1B:
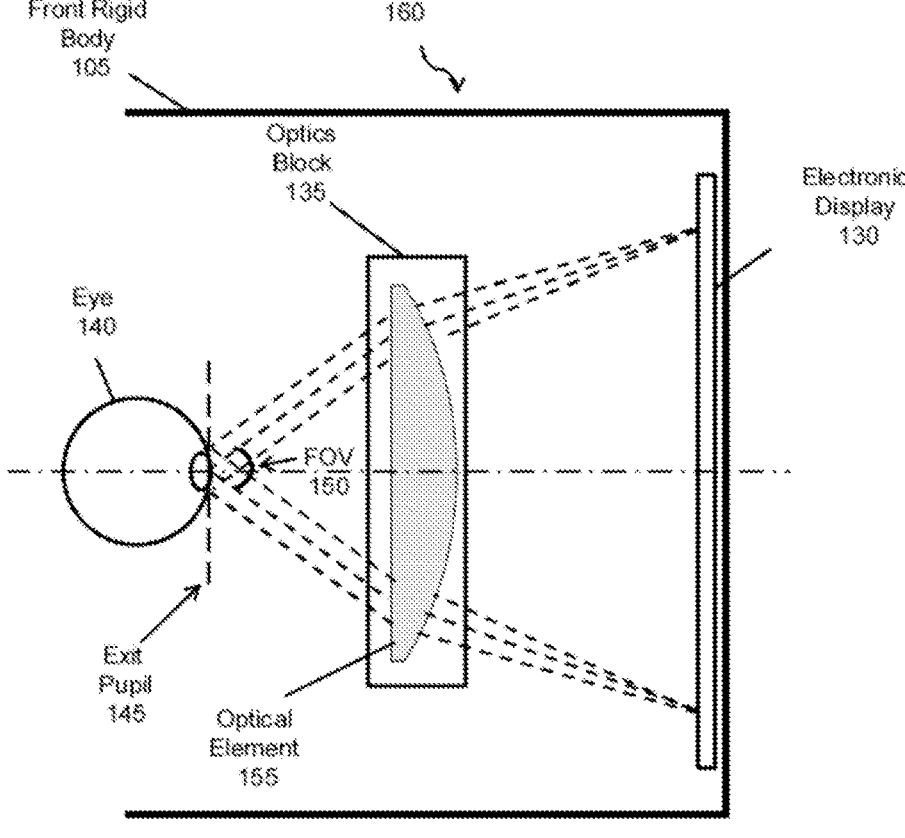
FIG. 1B is a cross section of the front rigid body of the embodiments of the near eye display illustrated in FIG. 1A.

FIG. 1B is a cross section 160 of the front rigid body 105 of the embodiments of the NED 100 illustrated in FIG. 1A. As shown, the front rigid body 105 includes an electronic display 130 and an optics block 135 that together provide image light to an exit pupil 145. The exit pupil 145 is the location of the front rigid body 105 where a user's eye 140 may be positioned. For purposes of illustration, FIG. 1B shows a cross section 160 associated with a single eye 140, but another optics block, separate from the optics block 135, may provide altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMO-LED), a QOLED, a QLED, some other display, or some combination thereof.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of the eye 140. The eye-box is a region defining how much the eye 140 moves up/down/left/right from without significant degradation in the image quality. In the illustration of FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140. The optics block 135 may include one or more optical elements 155 in optical series. An optical element 155 may be an aperture, a Fresnel lens, a convex lens, a concave lens, a filter, a waveguide, a Pancharatnam-Berry phase (PBP) lens or grating, a color-selective filter, a waveplate, a C-plate, or any other suitable optical element 155 that affects the image light. Moreover, the optics block 135 may include combinations of different optical elements. One or more of the optical elements in the optics block 135 may have one or more coatings, such as anti-reflective coatings.

Figure 2A:
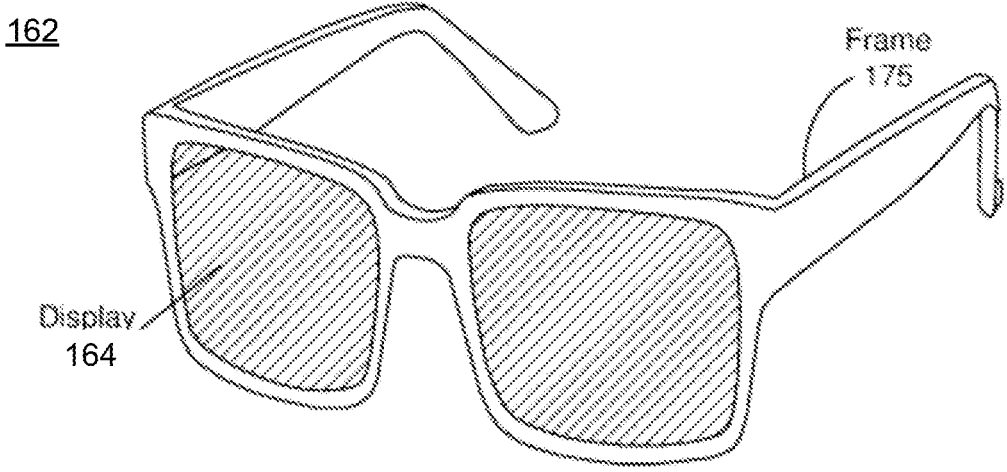
FIG. 2A is a diagram of a head-mounted display implemented as a near eye display, according to various embodiments.

FIG. 2A is a diagram of an HMD 162 implemented as a NED, according to various embodiments. As shown, the HMD 162 is in the form of a pair of augmented reality glasses. The HMD 162 presents computer-generated media to a user and augments views of a physical, real-world environment with the computer-generated media. Examples of computer-generated media presented by the HMD 162 include one or more images, video, audio, or some combination thereof. In some embodiments, audio is presented via an external device (e.g., speakers and headphones) that receives audio information from the HMD 162, a console (not shown), or both, and presents audio data based on audio information. In some embodiments, the HMD 162 may be modified to also operate as a virtual reality (VR) HMD, a MR HMD, or some combination thereof. The HMD 162 includes a frame 175 and a display 164. As shown, the frame 175 mounts the NED to the user's head, while the display 164 provides image light to the user. The display 164 may be customized to a variety of shapes and sizes to conform to different styles of eyeglass frames.

Figure 2B:
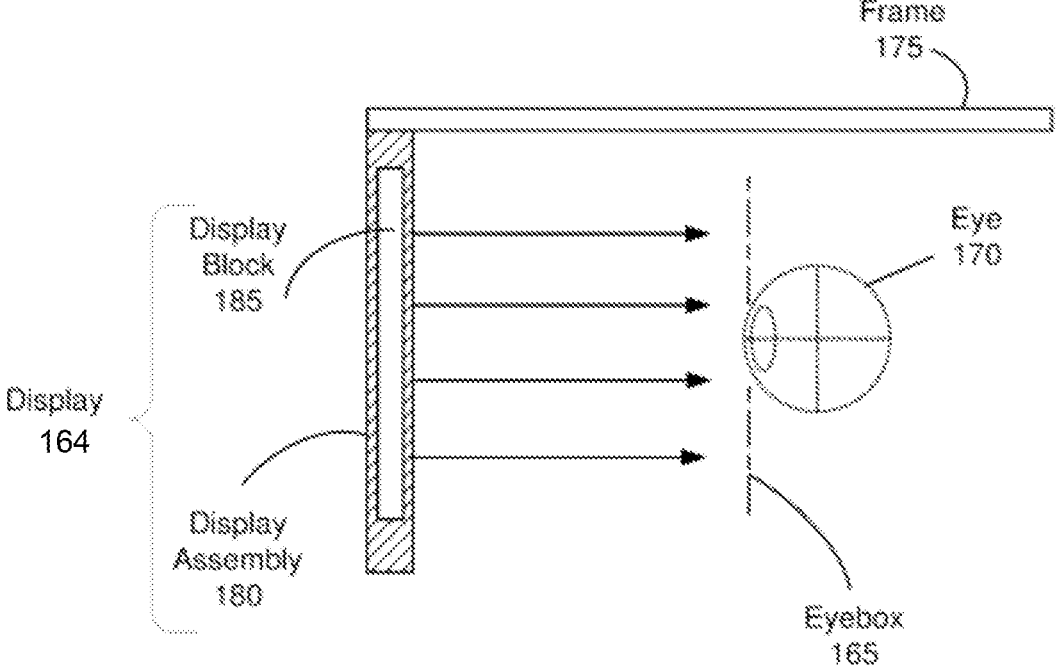
FIG. 2B is a cross-section view of the head-mounted display of FIG. 2A implemented as a near eye display, according to various embodiments.

FIG. 2B is a cross-section view of the HMD 162 of FIG. 2A implemented as a NED, according to various embodiments. This view includes frame 175, display 164 (which comprises a display assembly 180 and a display block 185), and eye 170. The display assembly 180 supplies image light to the eye 170. The display assembly 180 houses display block 185, which, in different embodiments, encloses the different types of imaging optics and redirection structures.

For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

The display block 185, as illustrated, is configured to combine light from a local area with light from a computer-generated image to form an augmented scene. The display block 185 is also configured to provide the augmented scene to the eyebox 165 corresponding to a location of the user's eye 170. The display block 185 may include, for example, a waveguide display, a focusing assembly, a compensation assembly, or some combination thereof.

HMD 162 may include one or more other optical elements between the display block 185 and the eye 170. The optical elements may act to, for example, correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. The display block 185 may also comprise one or more materials (e.g., plastic, glass, etc.) with one or more refractive indices that effectively minimize the weight and widen a field of view of the HMD 162.

Figure 3:
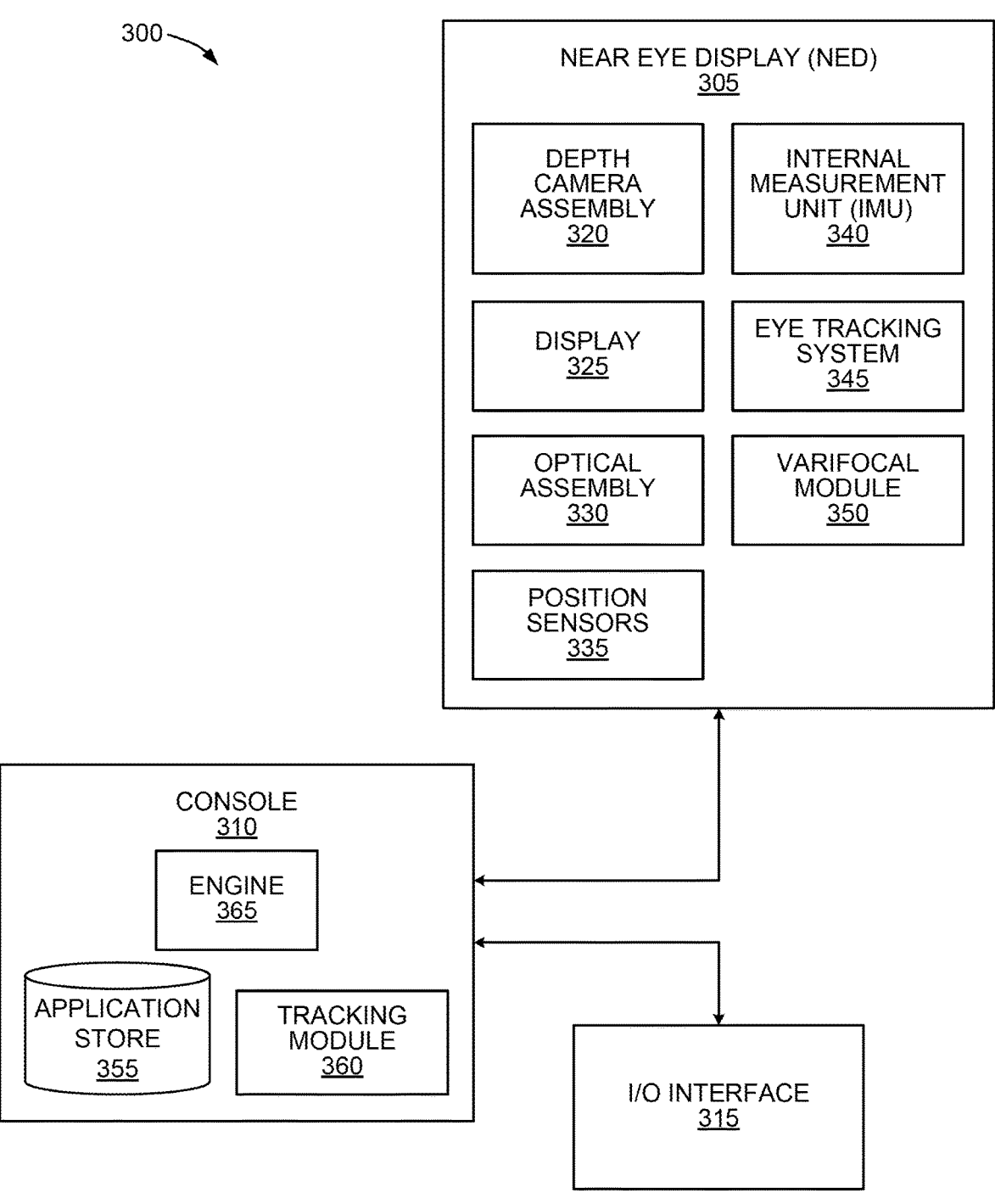
FIG. 3 is a block diagram of a near eye display system, according to various embodiments.

FIG. 3 is a block diagram of an embodiment of a near eye display system 300 in which a console 310 operates. In some embodiments, the NED system 300 corresponds to the NED 100 or the HMD 162. The NED system 300 may operate in a VR system environment, an AR system environment, a MR system environment, or some combination thereof. The NED system 300 shown in FIG. 3 comprises a NED 305 and an input/output (I/O) interface 315 that is coupled to the console 310.

While FIG. 3 shows an example NED system 300 including one NED 305 and one I/O interface 315, in other embodiments any number of these components may be included in the NED system 300. For example, there may be multiple NEDs 305 that each has an associated I/O interface 315, where each NED 305 and I/O interface 315 communicates with the console 310. In alternative configurations, different and/or additional components may be included in the NED system 300. Additionally, various components included within the NED 305, the console 310, and the I/O interface 315 may be distributed in a different manner than is described in conjunction with FIG. 3 in some embodiments. For example, some or all of the functionality of the console 310 may be provided by the NED 305.

The NED 305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 305 may also present audio content to a user. The NED 305 and/or the console 310 may transmit the audio content to an external device via the I/O interface 315. The external device may include various forms of speaker systems and/or headphones. In various embodiments, the audio content is synchronized with visual content being displayed by the NED 305.

The NED 305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 3, the NED 305 may include a depth camera assembly (DCA) 320, a display 325, an optical assembly 330, one or more position sensors 335, an inertial measurement unit (IMU) 340, an eye tracking system 345, and a varifocal module 350. In some embodiments, the display 325 and the optical assembly 330 can be integrated together into a projection assembly. Various embodiments of the NED 305 may have additional, fewer, or different components than those listed above. Additionally, the functionality of each component may be partially or completely encompassed by the functionality of one or more other components in various embodiments.

The DCA 320 captures sensor data describing depth information of an area surrounding the NED 305. The sensor data may be generated by one or a combination of depth imaging techniques, such as triangulation, structured light imaging, time-of-flight imaging, laser scan, and so forth. The DCA 320 can compute various depth properties of the area surrounding the NED 305 using the sensor data. Additionally or alternatively, the DCA 320 may transmit the sensor data to the console 310 for processing.

The DCA 320 includes an illumination source, an imaging device, and a controller. The illumination source emits light onto an area surrounding the NED 305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 325 displays two-dimensional or three-dimensional images to the user in accordance with pixel data received from the console 310. In various embodiments, the display 325 comprises a single display or multiple displays (e.g., separate displays for each eye of a user). In some embodiments, the display 325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 325 and used separately, in parallel, and/or in combination.

The optical assembly 330 magnifies image light received from the display 325, corrects optical errors associated with the image light, and presents the corrected image light to a user of the NED 305. The optical assembly 330 includes a plurality of optical elements. For example, one or more of the following optical elements may be included in the optical assembly 330: an aperture, a Fresnel lens, a convex lens, a concave lens, a filter, a reflecting surface, or any other suitable optical element that deflects, reflects, refracts, and/or in some way alters image light. Moreover, the optical assembly 330 may include combinations of different optical elements. In some embodiments, one or more of the optical elements in the optical assembly 330 may have one or more coatings, such as partially reflective or antireflective coatings. The optical assembly 330 can be integrated into a projection assembly, e.g., a projection assembly. In one embodiment, the optical assembly 330 includes the optics block 155.

In operation, the optical assembly 330 magnifies and focuses image light generated by the display 325. In so doing, the optical assembly 330 enables the display 325 to be physically smaller, weigh less, and consume less power than displays that do not use the optical assembly 330. Additionally, magnification may increase the field of view of the content presented by the display 325. For example, in some embodiments, the field of view of the displayed content partially or completely uses a user's field of view. For example, the field of view of a displayed image may meet or exceed 310 degrees. In various embodiments, the amount of magnification may be adjusted by adding or removing optical elements.

In some embodiments, the optical assembly 330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 325 is pre-distorted, and the optical assembly 330 corrects the distortion as image light from the display 325 passes through various optical elements of the optical assembly 330. In some embodiments, optical elements of the optical assembly 330 are integrated into the display 325 as a projection assembly that includes at least one waveguide coupled with one or more optical elements.

The IMU 340 is an electronic device that generates data indicating a position of the NED 305 based on measurement signals received from one or more of the position sensors 335 and from depth information received from the DCA 320. In some embodiments of the NED 305, the IMU 340 may be a dedicated hardware component. In other embodiments, the IMU 340 may be a software component implemented in one or more processors.

In operation, a position sensor 335 generates one or more measurement signals in response to a motion of the NED 305. Examples of position sensors 335 include: one or more accelerometers, one or more gyroscopes, one or more magnetometers, one or more altimeters, one or more inclinometers, and/or various types of sensors for motion detection, drift detection, and/or error detection. The position sensors 335 may be located external to the IMU 340, internal to the IMU 340, or some combination thereof.

Based on the one or more measurement signals from one or more position sensors 335, the IMU 340 generates data indicating an estimated current position of the NED 305 relative to an initial position of the NED 305. For example, the position sensors 335 may include multiple accelerometers to measure translational motion (forward/back, up/down, left/right) and multiple gyroscopes to measure rotational motion (e.g., pitch, yaw, and roll). In some embodiments, the IMU 340 rapidly samples the measurement signals and calculates the estimated current position of the NED 305 from the sampled data. For example, the IMU 340 may integrate the measurement signals received from the accelerometers over time to estimate a velocity vector and integrate the velocity vector over time to determine an estimated current position of a reference point on the NED 305. Alternatively, the IMU 340 provides the sampled measurement signals to the console 310, which analyzes the sample data to determine one or more measurement errors. The console 310 may further transmit one or more of control signals and/or measurement errors to the IMU 340 to configure the IMU 340 to correct and/or reduce one or more measurement errors (e.g., drift errors). The reference point is a point that may be used to describe the position of the NED 305. The reference point may generally be defined as a point in space or a position related to a position and/or orientation of the NED 305.

In various embodiments, the IMU 340 receives one or more parameters from the console 310. The one or more parameters are used to maintain tracking of the NED 305. Based on a received parameter, the IMU 340 may adjust one or more IMU parameters (e.g., a sample rate). In some embodiments, certain parameters cause the IMU 340 to update an initial position of the reference point so that it corresponds to a next position of the reference point. Updating the initial position of the reference point as the next calibrated position of the reference point helps reduce drift errors in detecting a current position estimate of the IMU 340.

In some embodiments, the eye tracking system 345 is integrated into the NED 305. The eye-tracking system 345 may comprise one or more illumination sources and an imaging device (camera). In operation, the eye tracking system 345 generates and analyzes tracking data related to a user's eyes as the user wears the NED 305. The eye tracking system 345 may further generate eye tracking information that may comprise information about a position of the user's eye, i.e., information about an angle of an eye-gaze.

In some embodiments, the varifocal module 350 is further integrated into the NED 305. The varifocal module 350 may be communicatively coupled to the eye tracking system 345 in order to enable the varifocal module 350 to receive eye tracking information from the eye tracking system 345. The varifocal module 350 may further modify the focus of image light emitted from the display 325 based on the eye tracking information received from the eye tracking system 345. Accordingly, the varifocal module 350 can reduce vergence-accommodation conflict that may be produced as the user's eyes resolve the image light. In various embodiments, the varifocal module 350 can be interfaced (e.g., either mechanically or electrically) with at least one optical element of the optical assembly 330.

In operation, the varifocal module 350 may adjust the position and/or orientation of one or more optical elements in the optical assembly 330 in order to adjust the focus of image light propagating through the optical assembly 330. In various embodiments, the varifocal module 350 may use eye tracking information obtained from the eye tracking system 345 to determine how to adjust one or more optical elements in the optical assembly 330. In some embodiments, the varifocal module 350 may perform foveated rendering of the image light based on the eye tracking information obtained from the eye tracking system 345 in order to adjust the resolution of the image light emitted by the display 325. In this case, the varifocal module 350 configures the display 325 to display a high pixel density in a foveal region of the user's eye-gaze and a low pixel density in other regions of the user's eye-gaze.

The I/O interface 315 facilitates the transfer of action requests from a user to the console 310. In addition, the I/O interface 315 facilitates the transfer of device feedback from the console 310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 315 may include one or more input devices. Example input devices include: a keyboard, a mouse, a game controller, a joystick, and/or any other suitable device for receiving action requests and communicating the action requests to the console 310. In some embodiments, the I/O interface 315 includes an IMU 340 that captures calibration data indicating an estimated current position of the I/O interface 315 relative to an initial position of the I/O interface 315.

In operation, the I/O interface 315 receives action requests from the user and transmits those action requests to the console 310. Responsive to receiving an action request, the console 310 performs a corresponding action. For example, responsive to receiving an action request, the console 310 may configure the I/O interface 315 to emit haptic feedback onto an arm of the user. For example, the console 315 may configure the I/O interface 315 to deliver haptic feedback to a user when an action request is received. Additionally or alternatively, the console 310 may configure the I/O interface 315 to generate haptic feedback when the console 310 performs an action, responsive to receiving an action request.

The console 310 provides content to the NED 305 for processing in accordance with information received from one or more of: the DCA 320, the NED 305, and the I/O interface 315. As shown in FIG. 3, the console 310 includes an application store 355, a tracking module 360, and an engine 365. In some embodiments, the console 310 may have additional, fewer, or different modules and/or components than those described in conjunction with FIG. 3. Similarly, the functions further described below may be distributed among components of the console 310 in a different manner than described in conjunction with FIG. 3.

The application store 355 stores one or more applications for execution by the console 310. An application is a group of instructions that, when executed by a processor, performs a particular set of functions, such as generating content for presentation to the user. For example, an application may generate content in response to receiving inputs from a user (e.g., via movement of the NED 305 as the user moves his/her head, via the I/O interface 315, etc.). Examples of applications include: gaming applications, conferencing applications, video playback applications, or other suitable applications.

The tracking module 360 calibrates the NED system 300 using one or more calibration parameters. The tracking module 360 may further adjust one or more calibration parameters to reduce error in determining a position and/or orientation of the NED 305 or the I/O interface 315. For example, the tracking module 360 may transmit a calibration parameter to the DCA 320 in order to adjust the focus of the DCA 320. Accordingly, the DCA 320 may more accurately determine positions of structured light elements reflecting off of objects in the environment. The tracking module 360 may also analyze sensor data generated by the IMU 340 in determining various calibration parameters to modify. Further, in some embodiments, if the NED 305 loses tracking of the user's eye, then the tracking module 360 may re-calibrate some or all of the components in the NED system 300. For example, if the DCA 320 loses line of sight of at least a threshold number of structured light elements projected onto the user's eye, the tracking module 360 may transmit calibration parameters to the varifocal module 350 in order to re-establish eye tracking.

The tracking module 360 tracks the movements of the NED 305 and/or of the I/O interface 315 using information from the DCA 320, the one or more position sensors 335, the IMU 340 or some combination thereof. For example, the tracking module 360 may determine a reference position of the NED 305 from a mapping of an area local to the NED 305. The tracking module 360 may generate this mapping based on information received from the NED 305 itself. The tracking module 360 may also utilize sensor data from the IMU 340 and/or depth data from the DCA 320 to determine reference positions for the NED 305 and/or I/O interface 315. In various embodiments, the tracking module 360 generates an estimation and/or prediction for a subsequent position of the NED 305 and/or the I/O interface 315. The tracking module 360 may transmit the predicted subsequent position to the engine 365.

The engine 365 generates a three-dimensional mapping of the area surrounding the NED 305 (i.e., the "local area") based on information received from the NED 305. In some embodiments, the engine 365 determines depth information for the three-dimensional mapping of the local area based on depth data received from the DCA 320 (e.g., depth information of objects in the local area). In some embodiments, the engine 365 calculates a depth and/or position of the NED 305 by using depth data generated by the DCA 320. In particular, the engine 365 may implement various techniques for calculating the depth and/or position of the NED 305, such as stereo based techniques, structured light illumination techniques, time-of-flight techniques, and so forth. In various embodiments, the engine 365 uses depth data received from the DCA 320 to update a model of the local area and to generate and/or modify media content based in part on the updated model.

The engine 365 also executes applications within the NED system 300 and receives position information, acceleration information, velocity information, predicted future positions, or some combination thereof, of the NED 305 from the tracking module 360. Based on the received information, the engine 365 determines various forms of media content to transmit to the NED 305 for presentation to the user. For example, if the received information indicates that the user has looked to the left, the engine 365 generates media content for the NED 305 that mirrors the user's movement in a virtual environment or in an environment augmenting the local area with additional media content. Accordingly, the engine 365 may generate and/or modify media content (e.g., visual and/or audio content) for presentation to the user. The engine 365 may further transmit the media content to the NED 305. Additionally, in response to receiving an action request from the I/O interface 315, the engine 365 may perform an action within an application executing on the console 310. The engine 305 may further provide feedback when the action is performed. For example, the engine 365 may configure the NED 305 to generate visual and/or audio feedback and/or the I/O interface 315 to generate haptic feedback to the user.

Sensing Binocular and Boresight Error from Light Field

An Augmented Reality (AR) system needs to project left- and right-eye images in correct directions towards the left and right eyes of a user, respectively, in order to produce a desired three-dimensional (3D) effect and avoid user discomfort. As described, the projected directions of the left- and right-eye images can become misaligned due to mechanically and/or thermally induced stresses that cause components of the AR system to move relative to each other.

Figure 4:
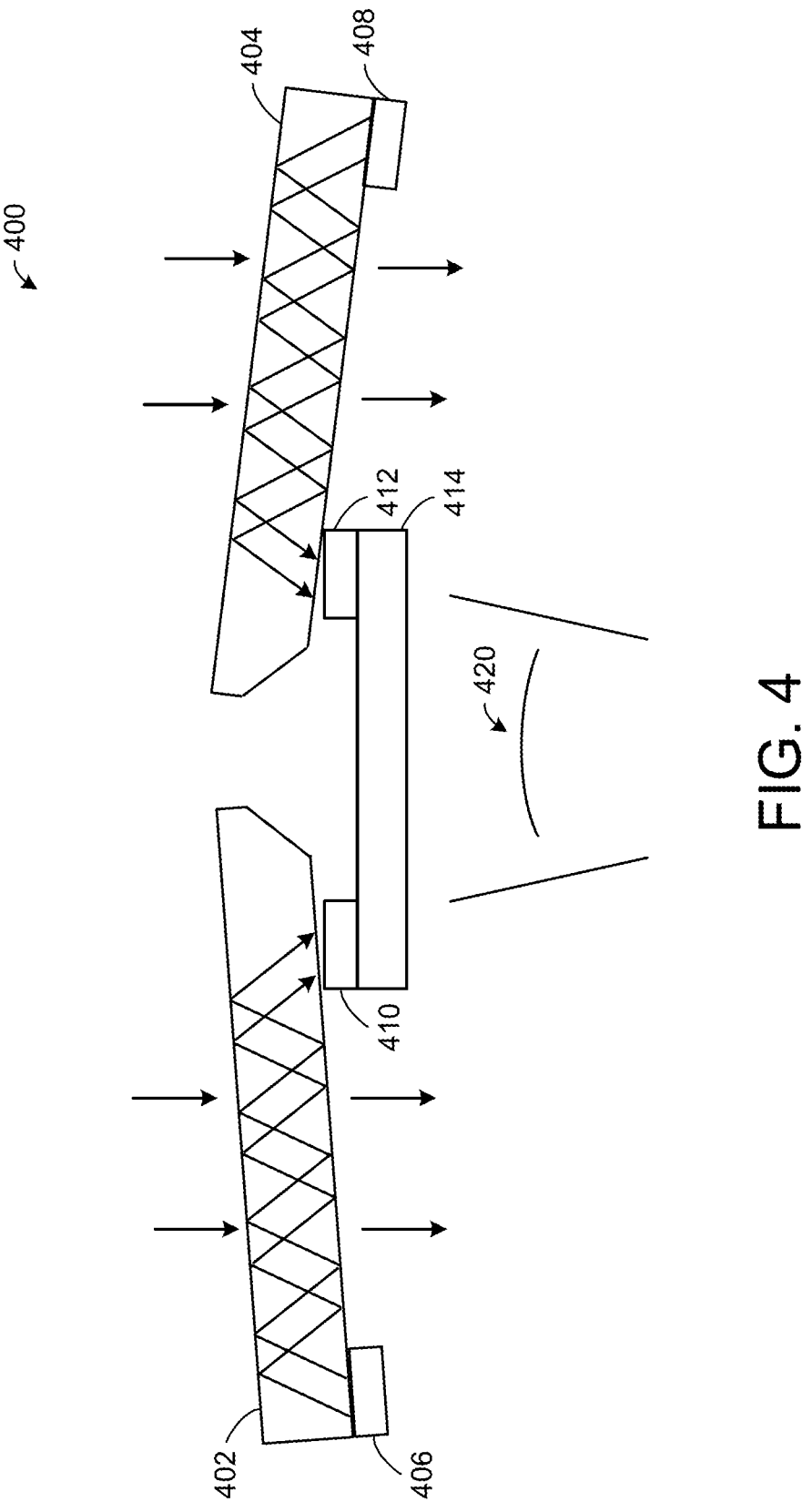
FIG. 4 illustrates a top-down view of an exemplar head-mounted display that uses angle sensors to detect light field binocular disparity and bore sight errors, according to various embodiments.

FIG. 4 illustrates a top-down view of an exemplar head-mounted display (HMD) 400 that uses angle sensors to detect light field binocular disparity and bore sight errors, according to various embodiments. The HMD 400 is an example of an AR system and can correspond to the NED 100, the HMD 162, and/or the NED 305 described above in conjunction with FIGS. 1A-1B, 2A-2B, and 3, respectively, in some embodiments. As shown, the HMD 400 includes waveguides 402 and 404 that guide light emitted by light and right projector assemblies 406 and 408 towards the left and right eyes of a user, respectively. In some embodiments, light, right projector assemblies 406 and 408 can be stand-alone projector assemblies that emit red, green, and blue light. A portion of the emitted light guided by the waveguides 402 and 404, as well as light from the world that passes through the waveguides 402 and 404, is incident on angle sensors 410 and 412 that are mounted on a bar 414. Angle sensors are sometimes also referred to as light field sensors or disparity sensors. The bar 414 can have any suitable shape and size in some embodiments, and the angle sensors 410 and 412 can be mounted on the bar 414 in any technically feasible manner, such as by gluing the angle sensors 410 and 412 to the bar 414 to form a monolithic structure, by mounting the angle sensors 410 and 412 to the bar 414 by mechanical means, etc. It should be understood that mounting the angle sensors 410 and 412 on the bar 414 maintains the positions and orientations of the angle sensors 410 and 412 relative to each other. In some embodiments, each angle sensor 410 and 412 can be a monochromatic sensor, a sensor that works for visible light or infrared (IR) light, or any other technically feasible type of sensor, such as a polychromatic sensor. In some embodiments, each of the angle sensors 410 and 412 includes an array of one or more angle sensors. For example, in some embodiments, each angle sensor 410 can include an array of angle-sensitive pixels (ASPs), or an array of any other technically feasible angle sensors. Exemplar angle sensors and arrays thereof are discussed in greater detail below in conjunction with FIGS. 5-6 and 9A-9B.

In some embodiments, the angle sensors 410 and 412 are positioned proximate to a nose bridge where the pads of the HMD 400 are located in order to detect light that is projected toward the left and right eyes, respectively. In some embodiments, the angle sensors 410 and 412 are embedded within a frame of the HMD 400. In some embodiments, angle sensors can be disposed on an opposite side of waveguides than the angle sensors 410 and 412 are disposed. In such cases, the angle sensors can detect a portion of light that is transmitted through the waveguides. In some embodiments, angle sensors can be positioned so as to detect any technically feasible light from a distance, without requiring waveguides. In some embodiments, angle sensors can be embedded within the frame of an HMD that implements an AR system.

In operation, the angle sensors 410 and 412 generate signals that can be used to determine the directions that light associated with left- and right-eye images are projected toward the left and right eyes of a user, respectively. After the projected directions of the left- and right-eye images are determined, a relative difference between the projected directions can be computed, and a correction can be applied to the projected directions of subsequent left- and/or right-eye images based on the relative difference, as discussed in greater detail below in conjunction with FIGS. 7-8 and 11. Illustratively, a relative projected angle change due to mechanically and/or thermally induced stress that needs to be corrected for is shown as angle 420 in FIG. 4.

Although described herein primarily with respect to AR systems in which angle sensors are placed in collimated space, where each point on a display corresponds to a direction, to determine the directions of projected light, in some embodiments, an AR system can include angle sensors placed in imaging space (converging or diverging light). For example, lenses that focus light can be placed between the waveguides 402 and 404 and the angle sensors 410 and 412. In particular, the angle sensors 410 and 412 can be placed at de-focused position(s) behind the lenses, such as behind or in front of imaging planes associated with the lenses. When an AR system includes angle sensors placed in imaging space, the angle sensors generate signals that can be used to determine directions of movement of content in the left- and right-eye images that are projected by the AR system. For example, the directions of movement could be captured as optical flows associated with the left- and right-eye images using angle sensors that are distributed across a field of view (FOV) and capture directions of motion associated points across the FOV, and binocular disparity errors can be corrected based on a comparison of the optical flows. In particular, the optical flows can be used to compute a displacement in angular space of content in the left- and right-eye images, such as whether the content is moving together or further apart, and the displacement can be fed back to correct binocular disparity errors in subsequent left- and right-eye images that are projected.

Figure 5:
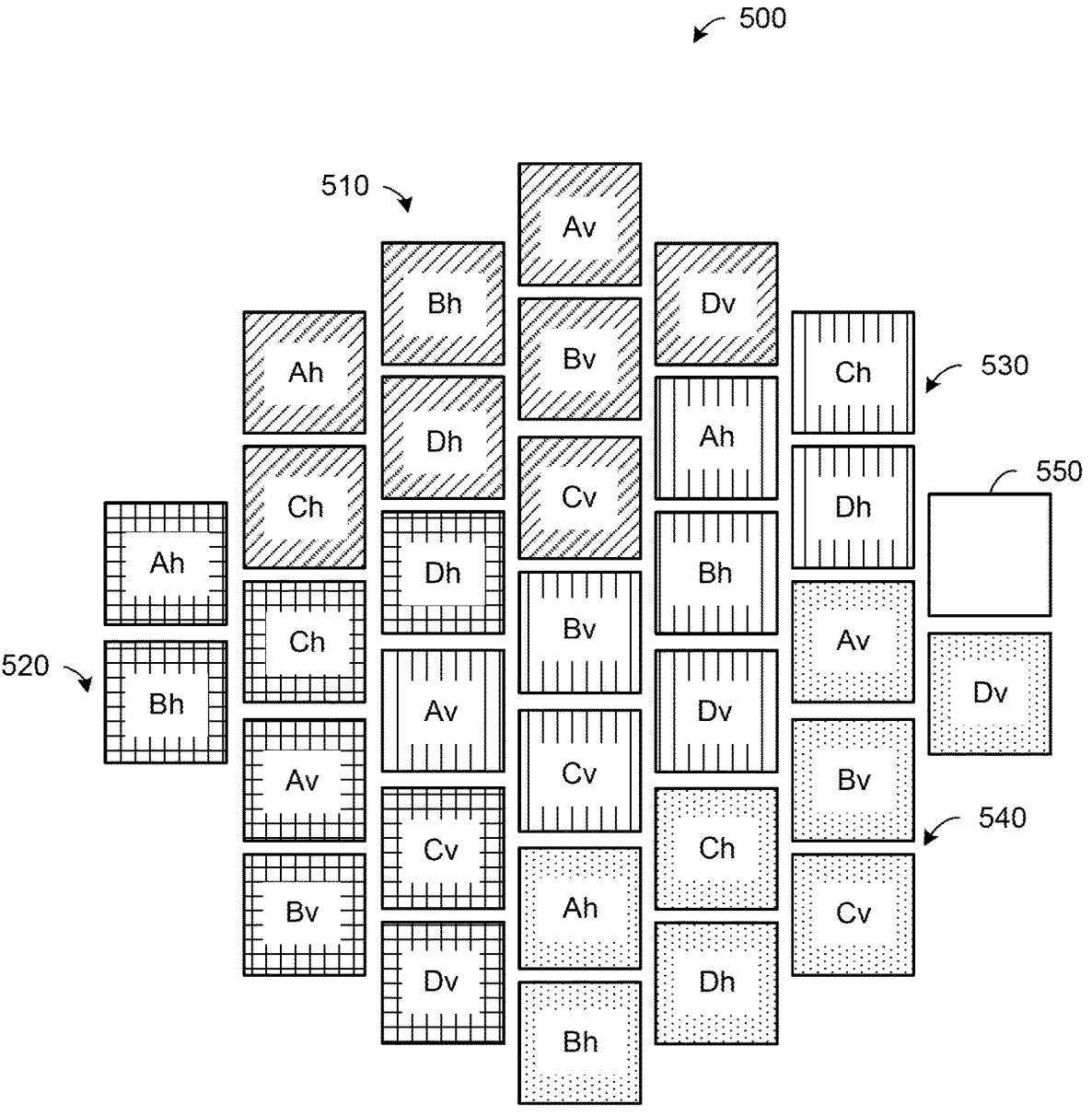
FIG. 5 illustrates an exemplar angle sensor that includes an array of angle sensors, according to various embodiments.

FIG. 5 illustrates an exemplar angle sensor 500 that includes an array of angle sensors, according to various embodiments. In some embodiments, the angle sensor 500 can be one of the angle sensors 410 or 412, described above in conjunction with FIG. 4. As shown, the angle sensor 500 includes arrays of angle sensors 510, 520, and 530 for detecting the direction of light for large dynamic range red, green, and blue wavebands of light. The arrays of angle sensors 510, 520, and 530 for large dynamic range red, green, and blue wavebands are used to correct for relative movements in the red, green, and blue projectors, respectively, in the projector assemblies 406 and 408, described above in conjunction with FIG. 4. The angle sensor 500 also includes an array 540 of angle sensors for detecting the direction of light for a small dynamic range green waveband of light. The frequencies of gratings in angle sensors of the arrays 510, 520, 530, and 540 set the dynamic range, or largest detectable errors, of those angle sensors. The two different dynamic ranges, namely the large and small dynamic ranges, are used to solve a problem that can arise with the cyclical response of an angle sensor. The large dynamic range provides a rough angle with the total range. For example, the large dynamic range could be +/−40 degrees with an accuracy of 1 degree, and the small dynamic range could be +/−2 degrees with an accuracy of 0.1 degrees. In such a case, by combining the two ranges, a +/−40 degree range with an accuracy of 0.1 degree can be achieved.

In some embodiments, each angle sensor in the arrays 510, 520, 530, and 540 of angle sensors is paired with a spectral filter for a corresponding waveband of light (e.g., a large dynamic range red, large dynamic range green, large dynamic range blue, or small dynamic range green waveband). In addition, the angle sensor 500 includes a blank angle sensor 550 that is not paired with a spectral filter and can be used for calibration purposes. Each angle sensor in the arrays 510, 520, 530, and 540 of angle sensors can be any suitable size in some embodiments. For example, each angle sensor could be approximately 10 microns×10 microns in size. An angle sensor placed in imaging space, described above, can also include an array of angle sensors associated with different frequencies, dynamic ranges, and/or orientations. Although described herein primarily with respect to using angle sensors to detect the directions of red, green, and blue light, achromatic angle sensors that cover the entire visible spectrum of light can be used in some embodiments.

Figure 6:
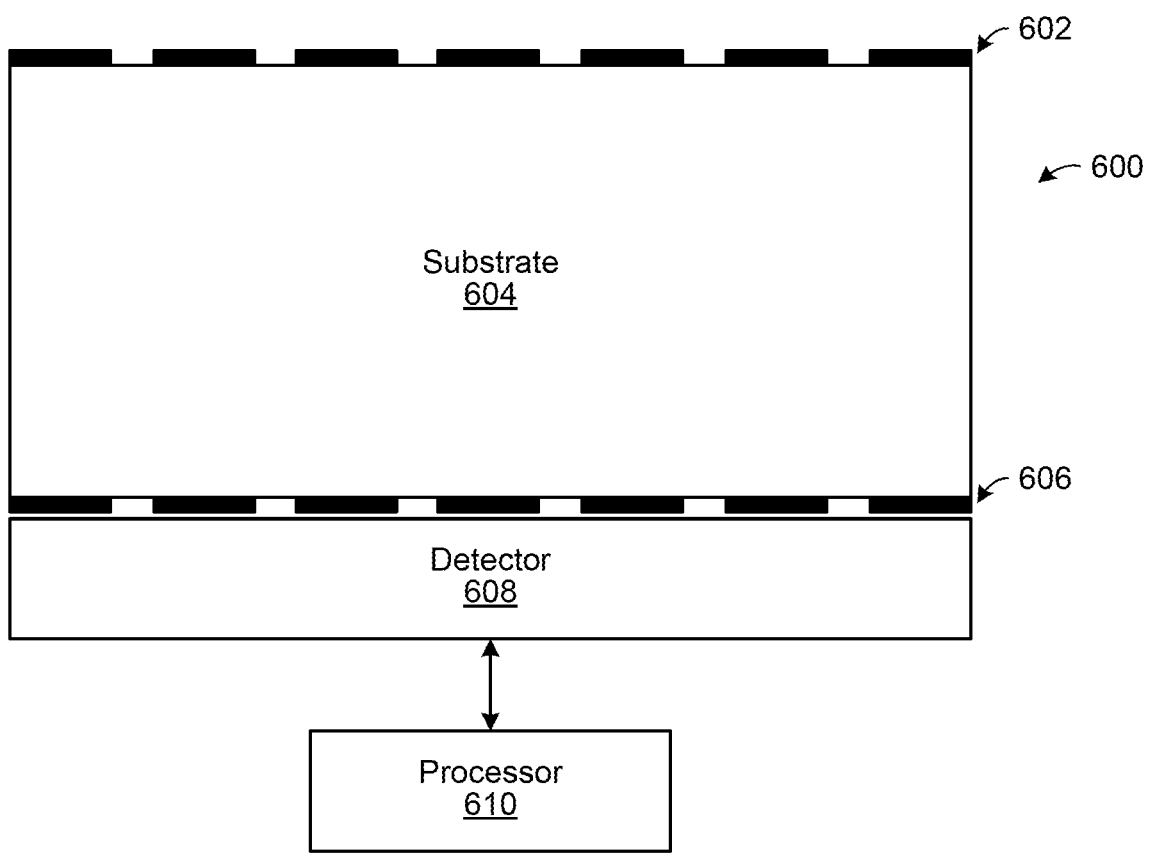
FIG. 6 illustrates an exemplar angle sensor that can be included in the angle sensor of FIG. 5, according to various embodiments.

FIG. 6 illustrates an exemplar angle sensor 600 that can be used as one of the angle sensors in the arrays 510, 520, 530, and 540 of angle sensors in the angle sensor 500, according to various embodiments. As shown, the angle sensor 600 includes an input periodic structure 602, a substrate 604, an analyzer periodic structure 606, and a detector 608. The angle sensor 600 exploits the Talbot effect, in which a plane wave that is incident on the input periodic structure 602 will reconstruct an image of the input periodic structure 602 at a distance called the Talbot distance, or a fraction or multiple of the Talbot distance. The input and analyzer periodic structures 602 and 606 are either aligned with each other or offset by a fraction of a period associated with the input and analyzer periodic structures 602 and 606. Accordingly, in the angle sensor 600, the amount of light reaching the detector 608 is proportional to a sinusoidal function of the incident angle of light, as the input and analyzer periodic structures 602 and 606 come in and out of phase with each other with shifting incident angle.

In some embodiments, each of the input and analyzer periodic structures 602 and 606 is a diffraction grating. In some other embodiments, each of the input and analyzer periodic structures 602 and 606 can be a phase grating that transmits light in a pattern of alternating phases, an array of lenses that are spaced a distance apart from each other, a liquid crystal (LC) grating, a MMI (multi-modal interference) device, a MEMS (microelectromechanical system) device including mirrors that can adjust a period of an input or analyzer periodic structure, a photonic device that includes a repeating pattern of ports, or the like.

In some embodiments, the detector 608 is a photodiode. In some embodiments, the analyzer periodic structure 606 can be omitted and the detector 608 can be replaced with a number of smaller detectors, such as an array of pixel sensors. In such cases, signals generated by the smaller detectors can be added together electronically to produce a similar effect as the analyzer periodic structure 606 and the detector 608.

In some embodiments, the angle sensor 600 can have any suitable size and be constructed from any technically feasible materials. For example, in the case of an angle sensor that uses diffraction gratings as the input and analyzer periodic structures, each diffraction grating could be constructed using repeating wires that are deposited on opposing sides of a glass, SiO$_2$, or other substrate using a photolithography technique, such as a CMOS (complementary metal oxide semiconductor) technique. In some embodiments, an angle sensor can include air, or any other medium that transmits the wavelengths of light of interest, rather than a substrate.

Returning to FIG. 5, each of the arrays 510, 520, 530, and 540 of angle sensors includes (1) an array of four angle sensors, denoted by Ah, Bh, Ch, and Dh, for detecting a direction of light along the horizontal (x) axis; and (2) an array of angle sensors, denoted by Av, Bv, Cv, and Dv for detecting a direction of light along the vertical (y) axis. Detecting the direction of light along different angular axes permits 3D movements of the direction of light to be determined. More generally, in some embodiments, angle sensors that are used to detect the direction of light along one axis (e.g., the x axis, y axes, or another axis) can include three or more angle sensors, and multiple arrays of sensors (e.g., in x, y and/or other orientations) can be used to determine changes in the projected direction of each of the left- and right-eye images in three dimensions. The angle sensors in an angle sensor array can include an analyzer periodic structure that is offset from an input periodic structure by a different fraction of a period associated with the input and analyzer periodic structures of the angle sensors. For example, in the case of three angle sensors oriented in the x direction, the analyzer periodic structures in the angle sensors could be offset from the input periodic structures by 0, $\pi/4$, and $\pi/2$. As another example, in the case of four angle sensors oriented in the x direction (e.g., the Ah, Bh, Ch, and Dh angle sensors in the arrays 510, 520, 530, and 540 of angle sensors), the analyzer periodic structures in the angle sensors could be offset from the input periodic structures by 0, $\pi/4$, $\pi/2$, and $3\pi/4$. Three angle sensors is the minimum number of angle sensors that can be used to detect the direction of light along one axis by solving for the direction based on the response signals from the angle sensors. More than three angle sensors with different offsets between input and analyzer periodic structures can be used to provide redundancy and/or to reduce noise, although including more angle sensors will generally increase the size of the device.

For four angle sensors oriented in either the x or y directions in the arrays 510, 520, 530, and 540 of angle sensors, signals from the four angle sensors can be expressed mathematically as:

$$S_1(\varphi) = \sum_\theta I(\theta, \varphi) \cdot F(\theta) \cdot [1 - m\cos(b\theta)]$$

$$S_2(\varphi) = \sum_\theta I(\theta, \varphi) \cdot F(\theta) \cdot [1 + m\sin(b\theta)]$$

$$S_3(\varphi) = \sum_\theta I(\theta, \varphi) \cdot F(\theta) \cdot [1 + m\cos(b\theta)]$$

$$S_4(\varphi) = \Sigma_\theta I(\theta,\varphi) \cdot F(\theta) \cdot [1 - m\sin(b\theta)],$$

where $S_1(\varphi)$, $S_2(\varphi)$, $S_3(\varphi)$, $S_4(\varphi)$ are the four signals from the angle sensors, $I(\theta, \varphi)$ is the projected image, and $F(\theta)$ is the apodization function. Given such signals, an angle of the detected light, modulo $2\pi$, can be computed as:

$$\varphi = \frac{1}{b} \cdot \tan^{-1}\left(\frac{S_2(\varphi) - S_4(\varphi)}{S_3(\varphi) - S_1(\varphi)}\right).$$

A similar angle can be computed for a shifted image $I(\theta, \varphi+\Delta\varphi)$ that is projected toward the other eye:

$$(\varphi + \Delta\varphi) = \frac{1}{b} \cdot \tan^{-1}\left(\frac{S_2(\varphi + \Delta\varphi) - S_4(\varphi + \Delta\varphi)}{S_3(\varphi + \Delta\varphi) - S_1(\varphi + \Delta\varphi)}\right).$$

Then, a disparity, i.e., a relative difference, between the angles can be computed as follows:

$$\text{Disparity} = \Delta\varphi = (\varphi + \Delta\varphi) - \varphi.$$

Exemplar uses of the above computation to obtain a relative difference between angles at which the red channel of left- and right-eye images are projected are described below in conjunction FIGS. 7-8. Although described herein primarily with respect to the above computation as a reference example, in some embodiments, the disparity between the angles can be computed in any technically feasible manner. For example, in some embodiments, other phase shifting techniques such as Fourier Transform or other algorithms can be used to extract a phase from multiple angle sensor signals ($\geq 3$ angle sensor signals).

Figure 7:
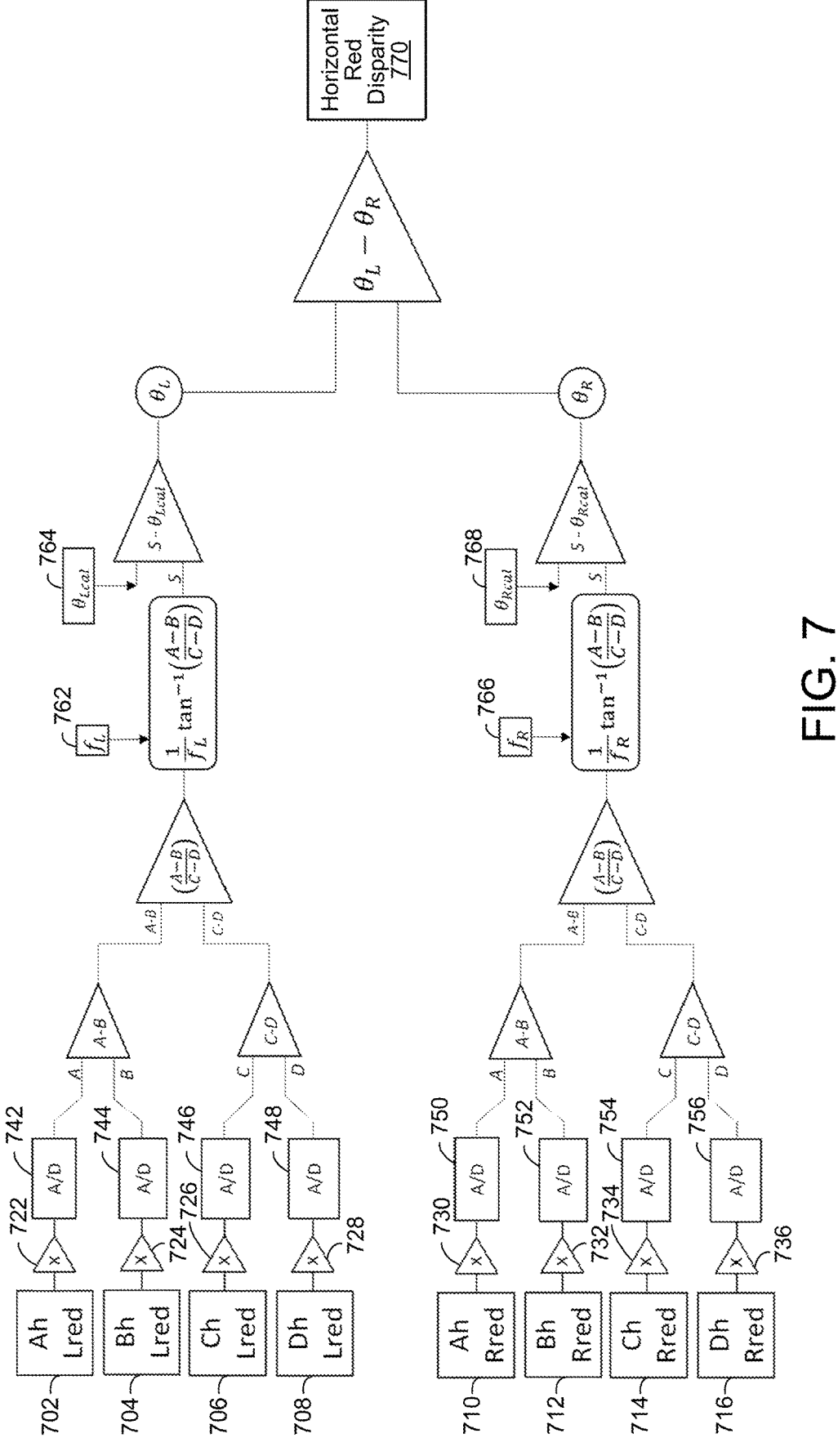
FIG. 7 illustrates an approach for computing a relative difference between angles at which the red channel of left- and right-eye images are projected based on signals from horizontal angle sensors, according to various embodiments.

FIG. 7 illustrates an approach for computing a relative difference between angles at which the red channel of left- and right-eye images are projected based on horizontal angle sensor signals, according to various embodiments. In the example of FIG. 7, light from the environment, which is also referred to herein as light from the "world," is not subtracted out. As shown, signals 702, 704, 706, and 708 generated by angle sensors oriented in the horizontal (x) direction for a left eye, denoted by Ah Lred, Bh Lred, Ch Lred, and Dh Lred, respectively, are amplified by amplifiers 722, 724, 726, and 728, respectively, and the amplified signals are converted to digital signals by analog-to-digital (A/D) converters 742, 744, 746, and 748, respectively. In some embodiments, the Ah Lred, Bh Lred, Ch Lred, and Dh Lred signals 702, 704, 706, and 708 can be generated by the Ah, Bh, Ch, and Dh angle sensors, respectively, in the array 510 of angle sensors for the large dynamic range red waveband of light, described above in conjunction with FIG. 5. In some embodiments, the Ah Lred, Bh Lred, Ch Lred, and Dh Lred signals 702, 704, 706, and 708 are acquired substantially simultaneously (i.e., angle sensor readings are synchronized).

As shown, a signal B that is generated by amplifying the Bh Lred signal 704 via the amplifier 724 and converting the amplified signal to a digital signal via the A/D converter 744, is subtracted from a corresponding signal A that is generated by amplifying the Ah Lred 702 signal via the amplifier 722 and converting the amplified signal to a digital signal via the A/D converter 742, in order to obtain the difference A-B. Similarly, a signal D that is generated by amplifying the Dh Lred 708 signal via the amplifier 728 and converting the amplified signal to a digital signal via the A/D converter 748, is subtracted from a signal C that is generated by amplifying the Ch Lred signal 706 via the amplifier 726 and converting the amplified signal to a digital signal via the A/D converter 746, to obtain the difference C-D. The difference A-B is then divided by the difference C-D, and an arctangent of (A-B)/(C-D) is computed to obtain an angle. In addition, the angle is multiplied by $1/f_L$, where $f_L$ is a left channel scaling factor 762 that depends on the angle sensor, to give an angle denoted by S. The left channel scaling factor $f_L$ can differ from a right channel scaling factor $f_R$ because of manufacturing errors, and the left and right channel scaling factors $f_L$ and $f_R$ for specific angle sensor devices can be determined via a calibration process. An angle from calibration 764, denoted by $\theta_{Lcal}$, is subtracted the angle S to obtain an angle of projection OL (relative to the calibration angle) for the red channel of the left-eye image.

Similar computational steps are performed for signals generated by angle sensors 710, 712, 714, and 716 oriented in the horizontal (x) direction for a right eye, denoted by Ah Rred, Bh Rred, Ch Rred, and Dh Rred, in order to obtain an angle of projection $\theta_R$ (relative to a calibration angle) for the red channel of the right-eye image. A disparity between the projection angles associated with the red channel of the left- and right-eye images, shown as horizontal red disparity 770, is then computed by subtracting $\theta_R$ from $\theta_L$ (or vice versa).

Although FIG. 7 is described with respect to the relative difference between the angles at which the red channel of left- and right-eye images are projected based on horizontal angle sensor signals as a reference example, similar computations can be performed for signals acquired by (large and/or small dynamic range) green and blue horizontal angle sensors, as well as signals acquired by (large and/or small dynamic range) red, green, and blue vertical angle sensors.

Figure 8:
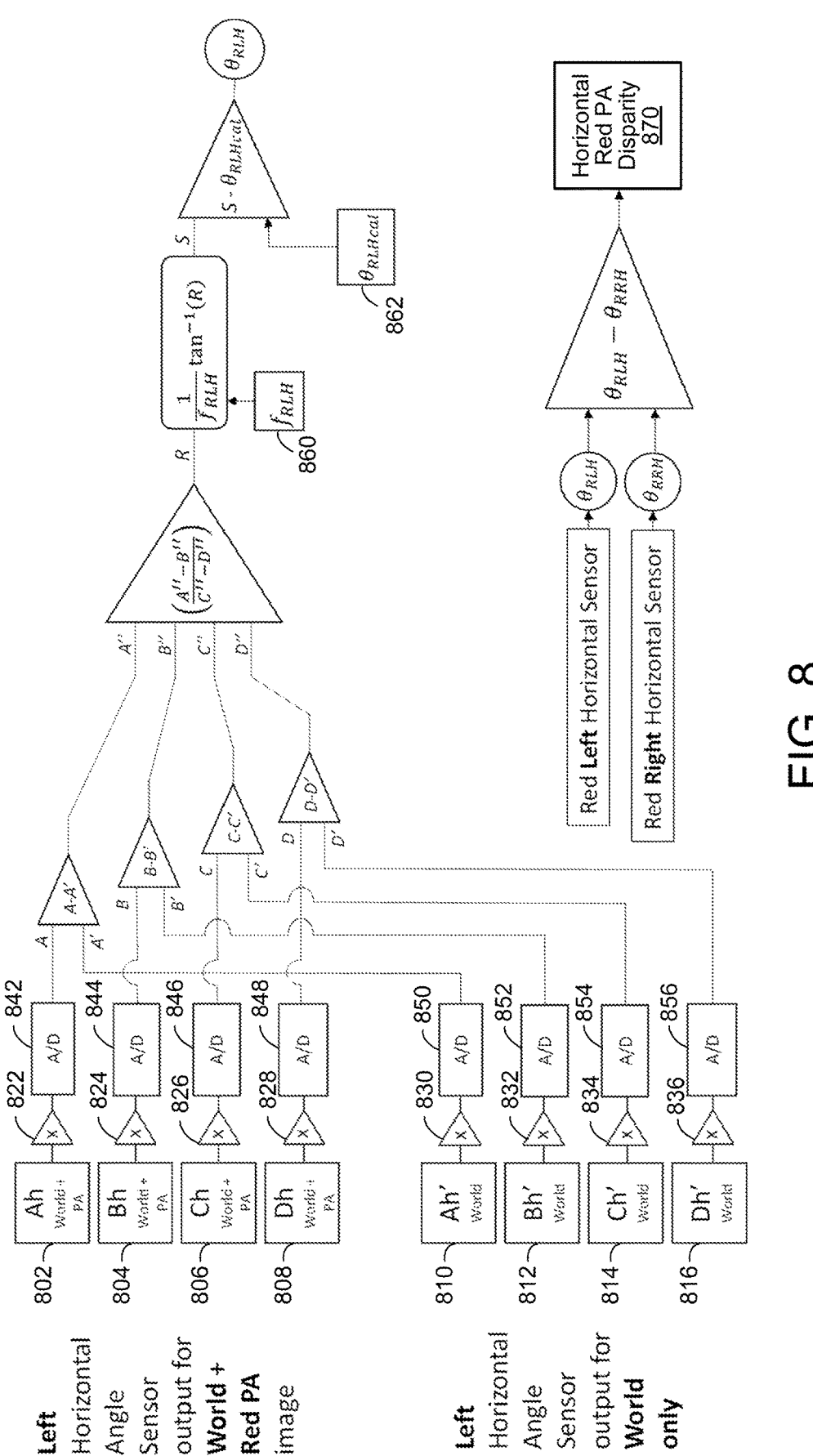
FIG. 8 illustrates an approach for computing a relative difference between angles at which the red channel of left- and right-eye images are projected while subtracting light from the environment, according to various embodiments.

FIG. 8 illustrates an approach for computing a relative difference between angles at which the red channel of left- and right-eye images are projected while subtracting light from the environment, according to various embodiments. As shown, signals 802, 804, 806, and 808 generated by angle sensors that are oriented in the horizontal (x) direction for a left eye and that capture light from the world as well as light from a projector assembly ("PA"), denoted by Ah World+PA, Bh World+PA, Ch World+PA, and Dh World+PA, respectively, are amplified by amplifiers 822, 824, 826, and 828, respectively, and the amplified signals are converted to digital signals by A/D converters 842, 844, 846, and 848, respectively. In some embodiments, the Ah World+PA, Bh World+PA, Ch World+PA, and Dh World+PA signals 802, 804, 806, and 808 can be generated by the Ah, Bh, Ch, and Dh angle sensors, respectively, in the array 510 of angle sensors for the large dynamic range red waveband of light, described above in conjunction with FIG. 5. In some embodiments, the Ah World+PA, Bh World+PA, Ch World+PA, and Dh World+PA signals 702, 704, 706, and 708 are acquired substantially simultaneously (i.e., angle sensor readings are synchronized).

At a different time, signals 812, 814, 816, and 818, denoted by denoted by Ah' World, Bh' World, Ch' World, and Dh' World, are generated by the same angle sensors that are oriented in the horizontal (x) direction for the left eye and that capture light from only the world. For example, the projector assembly could be turned off when the signals 812, 814, 816, and 818 are acquired. In some embodiments, the time difference can be as little as possible so that the background does not change significantly from when the signals 802, 804, 806, and 808 are acquired to when the signals 812, 814, 816, and 818 are acquired. For example, in some embodiments, the time difference can be the frame rate, meaning the signals 802, 804, 806, and 808 are acquired one frame before or after the signals 812, 814, 816, and 818. In some other embodiments, the time difference can be greater or less than the frame rate. Illustratively, the Ah' World, Bh' World, Ch' World, and Dh' World signals 812, 814, 816, and 818 are amplified by amplifiers 830, 832, 834, and 836, respectively, and the amplified signals are converted to digital signals by A/D converters 850, 852, 854, and 846, respectively. In some embodiments, the Ah' World, Bh' World, Ch' World, and Dh' World signals 812, 814, 816, and 818 can be generated by the Ah, Bh, Ch, and Dh angle sensors, respectively, in the array 510 of angle sensors for the large dynamic range red waveband of light, described above in conjunction with FIG. 5. In some embodiments, the Ah' World, Bh' World, Ch' World, and Dh' World signals 812, 814, 816, and 818 are acquired substantially simultaneously (i.e., angle sensor readings are synchronized).

In order to subtract out the world image (i.e., the background), a signal A' that is generated by amplifying the Ah' World signal 810 via the amplifier 830 and converting the amplified signal to a digital signal via the A/D converter 850, is subtracted from a corresponding signal A that is generated by amplifying the Ah World+PA signal 802 via the amplifier 722 and converting the amplified signal to a digital signal via the A/D converter 842, in order to obtain the difference A-A', which is also denoted by A". Similarly, a signal B' that is generated by amplifying the Bh' World signal 812 via the amplifier 832 and converting the amplified signal to a digital signal via the A/D converter 852, is subtracted from a corresponding signal B that is generated by amplifying the Bh World+PA signal 804 via the amplifier 824 and converting the amplified signal to a digital signal via the A/D converter 844, in order to obtain the difference B-B', which is also denoted by B". Similarly, a signal C' that is generated by amplifying the Ch' World signal 814 via the amplifier 834 and converting the amplified signal to a digital signal via the A/D converter 854, is subtracted from a corresponding signal C that is generated by amplifying the Ch World+PA signal 806 via the amplifier 826 and converting the amplified signal to a digital signal via the A/D converter 864, in order to obtain the difference C-C', which is also denoted by C". Similarly, a signal D' that is generated by amplifying the Dh' World signal 816 via the amplifier 836 and converting the amplified signal to a digital signal via the A/D converter 856, is subtracted from a corresponding signal D that is generated by amplifying the Dh World+PA signal 808 via the amplifier 828 and converting the amplified signal to a digital signal via the A/D converter 848, in order to obtain the difference D-D', which is also denoted by D".

As shown, an arctangent of (A"-B")/(C"-D") is computed to obtain an angle, which is multiplied by $1/f_{RLH}$, where $f_{RLH}$ is an adjustable left channel scaling factor 860 that depends on the angle sensor, to give an angle denoted by S. The left channel scaling factor $f_{RLH}$ can differ from a right channel scaling factor $f_{RRH}$ because of manufacturing errors, and the left and right channel scaling factors $f_{RLH}$ and $f_{RRH}$ for specific angle sensor devices can be determined via a calibration process. An angle from calibration 862, denoted by $\theta_{RLHcal}$, is subtracted from the angle S to obtain an angle of projection $\theta_{RLH}$ (relative to the calibration angle) for the red channel of the left-eye image.

Similar computational steps are performed for signals generated by angle sensors oriented in the horizontal (x) direction for a right eye in order to obtain an angle of projection $\theta_{RRH}$ (relative to a calibration angle) for the red channel of the right-eye image. A disparity between the projection angles associated with the red channel of the left- and right-eye images, shown as horizontal red PA disparity 870, is then computed by subtracting $\theta_{RRH}$ from $\theta_{RLH}$ (or vice versa).

Although FIG. 8 is described with respect to the relative difference between the angles at which the red channel of left- and right-eye images are projected based on horizontal angle sensor signals as a reference example, similar computations can be performed for signals acquired by (large and/or small dynamic range) green and blue horizontal angle sensors, as well as signals acquired by (large and/or small dynamic range) red, green, and blue vertical angle sensors.

Although exemplar computations of the relative difference between angles at which left- and right-eye images are projected are described above in conjunction with FIGS. 7-8, more generally, in some embodiments, techniques for detecting binocular disparity and bore sight errors between left- and right-eye images in an AR system include performing a calibration procedure, and then, in real time, (1) computing a relative difference between projection angles associated with the left- and right-eye images that are measured by one or more angle sensors (e.g., angle sensors associated with a particular color channel), and (2) applying a correction to the projected directions of subsequent left- and/or right-eye images based on the relative difference. Light from the environment can be subtracted out, or not subtracted out, when computing the relative difference between the projection angles. The calibration procedure can include projecting one or more images for which the signals produced by the angle sensors are known, and adjusting the direction of projection of the one or more images as appropriate. Subsequent to calibration, signals produced by the angle sensors are used to determine a direction (or optical flow) associated with each of the left- and right-eye images that are projected by the AR system. The direction can be determined with respect to a calibrated direction, described above, as a baseline. In some embodiments, determining the direction (or optical flow) can include modeling responses of the angle sensors in any technically feasible manner, such as using a first-order model, a plane wave decomposition model, a FDTD (finite difference time-domain)/RCWA (rigorous coupled wave analysis) model, or the like. A relative difference between the directions (or optical flows) associated with the left- and right-eye images can then be determined and used to adjust the projection directions of the left- and/or the right-eye images. A correction can be applied to only the projection direction of the left-image, to only the projection direction of the right-image, or to the projection directions of both the left- and right-eye images, in some embodiments.

Figure 9A:
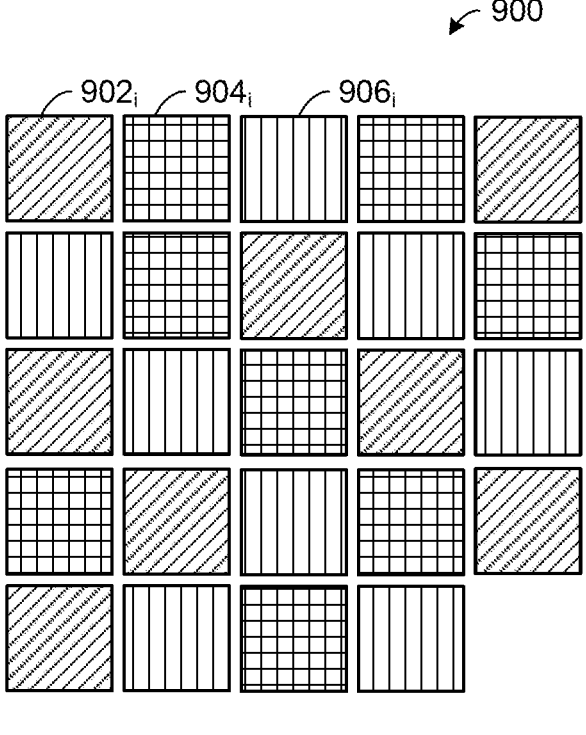
FIGS. 9A-9B illustrate exemplar arrays of angle sensors, according to various other embodiments.
Figure 9B:
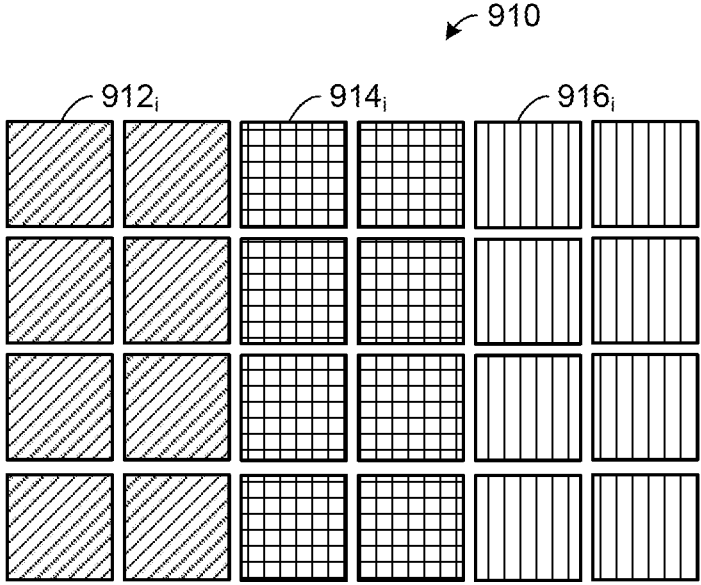

FIGS. 9A-9B illustrate exemplar arrays of angle sensors 900 and 910, according to various other embodiments. In some embodiments, the arrays of angle sensors 900 and 910 can be included in the angle sensors 410 and 412, described above in conjunction with FIG. 4. As shown in FIG. 9A, the array of angle sensors 900 is square in shape and includes sets of angle sensors 902$i$ (referred to herein collectively as angle sensors 902 and individually as an angle sensor 902), 904$i$ (referred to herein collectively as angle sensors 904 and individually as an angle sensor 904), and 906$i$ (referred to herein collectively as angle sensors 906 and individually as an angle sensor 906) for detecting the directions of red, green, and blue wavebands of light, respectively. The sets of angle sensors 902, 904, and 906 are similar to the arrays of angle sensors 510, 520, and 530, described above in conjunction with FIG. 5, except the sets of angle sensors 902, 904, and 906 are arranged differently.

As shown in FIG. 9B, the array of angle sensors 910 is rectangular in shape and includes arrays of angle sensors 912$i$ (referred to herein collectively as angle sensors 912 and individually as an angle sensor 912), 914$i$ (referred to herein collectively as angle sensors 914 and individually as an angle sensor 914), and 916$i$ (referred to herein collectively as angle sensors 916 and individually as an angle sensor 916) for detecting the directions of red, green, and blue wavebands of light, respectively. The arrays of angle sensors 912, 914, and 916 are similar to the arrays of angle sensors 510, 520, and 530, described above in conjunction with FIG. 5, except the arrays of angle sensors 912, 914, and 916 are arranged differently.

Although exemplar arrays of angle sensors are shown in FIGS. 5 and 9A-9B for illustrative purposes, it should be understood that, in some embodiments, angle sensors can include any technically feasible types and configurations of angle sensors, including arrays of angle sensors forming any suitable shape and distributed angle sensors.

Figure 10:
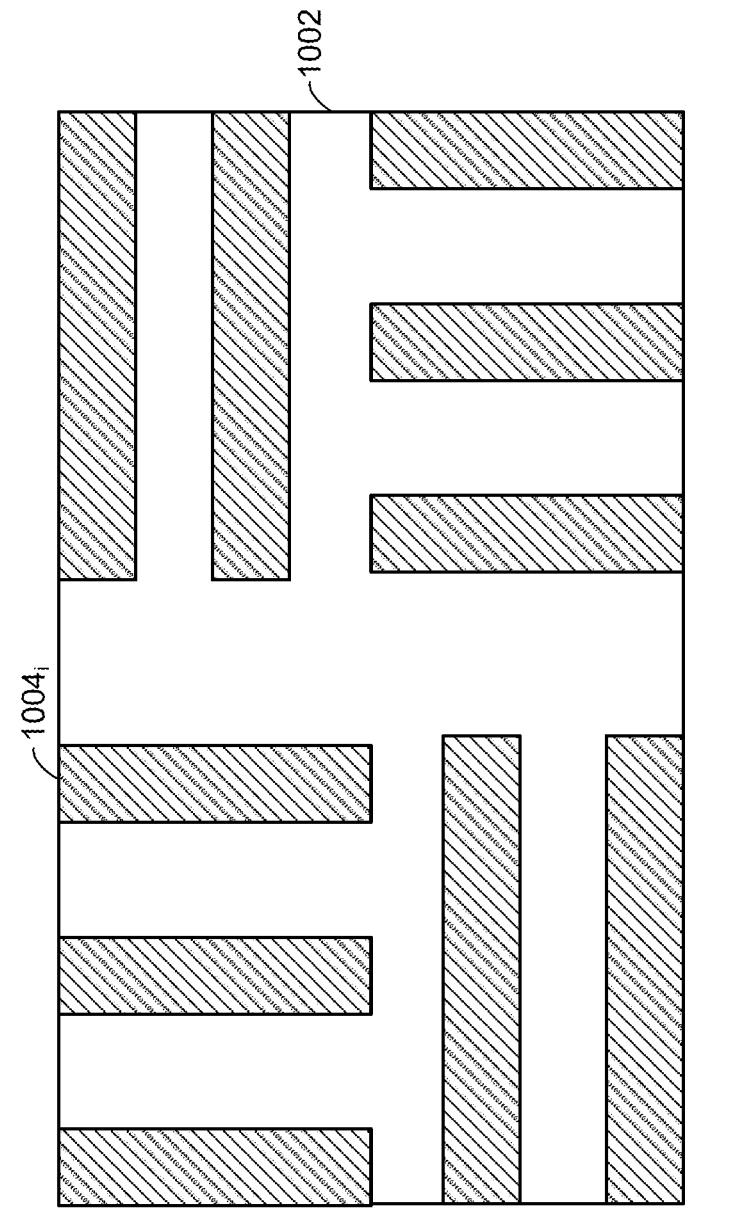
FIG. 10 illustrates an exemplar projected image that can be used to detect light field binocular disparity and bore sight errors, according to various embodiments.

FIG. 10 illustrates an exemplar projected image that can be used to detect light field binocular disparity and bore sight errors, according to various embodiments. As shown, an image 1000 can be projected (e.g., by the HMD 400) as left- and right-eye images, and disparities in the projected angles can be determined using angle sensors. Illustratively, the image 1000 includes a region 1002 of zero or relatively low signal, as well as multiple linear regions 1004; of relatively high signal (referred to herein collectively as linear regions 1004 and individually as a linear region 1004). For example, in some embodiments, the region 1002 can be black, and the linear regions 1004 can be white. In some other embodiments, the region 1002 and the linear regions 1004 can be any suitable colors. Experience has shown that the pattern of low and high signal regions in the image 1000 tends to maximize a contrast of the signal for an angle sensor to detect the angle at which the image 1000 is projected.

Although an exemplar image 1000 is shown for illustrative purposes, in some embodiments, any suitable image can be projected as left- and right-eye images in order to detect binocular disparity and bore sight errors between the left- and right-eye images using angle sensors. For example, in some embodiments, the image could include one or more lines, one or more squares or other shapes, some other pattern, a real image, etc.

Figure 11:
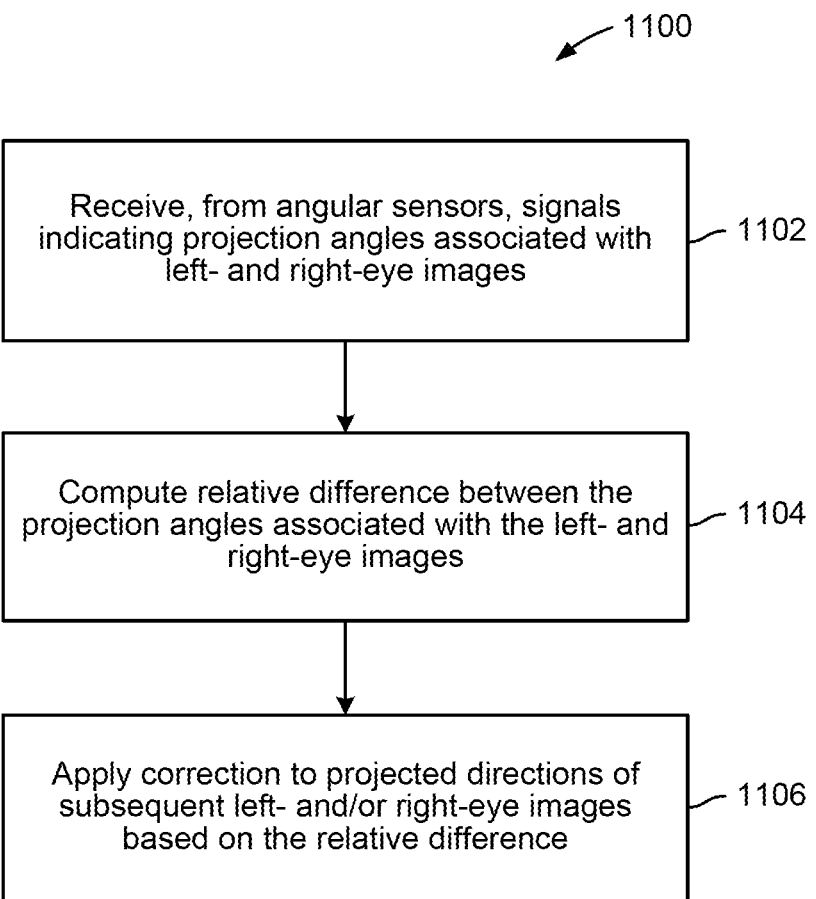
FIG. 11 is a flow diagram illustrating a method for correcting light field binocular disparity and bore sight errors, according to various embodiments.

FIG. 11 is a flow diagram illustrating a method 1100 for correcting light field binocular disparity and bore sight errors, according to various embodiments. In some embodiments, the method 1100 can be performed in real time after a calibration procedure, such as the calibration procedures described above in conjunction with FIGS. 7-8. Although the method steps are described with reference to the systems of FIGS. 1-10, persons skilled in the art will understand that any system may be configured to implement the method steps, in any order, in other embodiments.

As shown, the method 1100 begins at step 1102, where a binocular disparity and bore sight error detection application receives, from angle sensors, signals indicating the projection angles associated with left- and right-eye images. The binocular disparity and bore sight error detection application can be stored in the application store 355, or elsewhere, in some embodiments.

At step 1104, the binocular disparity and bore sight error detection application computes a relative difference between the projection angles associated with the left- and right-eye images. In some embodiments, the relative difference can be computed according to the techniques described above in conjunction with FIG. 7, which do not subtract out the world image (i.e., the background). In some other embodiments, the relative difference can be computed according to the techniques described above in conjunction with FIG. 8, which do subtract out the world image.

At step 1106, the binocular disparity and bore sight error detection application applies a correction to the projected directions of subsequent left- and/or right-eye images based on the relative difference computed at step 1004. As described, a correction can be applied to only the projection direction of the left-image, to only the projection direction of the right-image, or to the projection directions of both the left- and right-eye images, in some embodiments.

Although described herein primarily with respect to AR systems as a reference example, techniques disclosed herein for detecting binocular disparity and bore sight errors from light fields can be used with other extended reality (XR)

systems, such as mixed reality (MR) and virtual reality (VR) systems, in some embodiments. For example, in some embodiments, an HMD (e.g., HMD 400) can implement an XR system that detects binocular disparity and bore sight errors between left- and right-eye images according to techniques disclosed herein.

One advantage of the techniques disclosed herein relative to the prior art is the disclosed AR (and other extended reality) systems include angle sensors that can be smaller in size than the imaging systems that are used to detect misalignments between the projected directions of left- and right-eye images in conventional AR systems. The disclosed AR systems include fewer components that need to be aligned relative to each other than conventional AR systems. Further, the angle sensors in the disclosed AR systems can require less power to operate than the imaging systems in conventional AR systems, and angle sensor data acquired by the disclosed AR systems can also be processed faster, while consuming less power, than image data acquired by conventional AR systems. In addition, the detectors, such as photodiodes, in the disclosed AR systems can operate at higher speeds and provide better signal-to-noise ratios than the image sensors in conventional AR systems. These technical advantages represent one or more technological advancements over prior art approaches.

1. In some embodiments, a sensing device comprises a first angle sensor configured to detect a first portion of light projected toward a left eye, and a second angle sensor configured to detect a second portion of light projected toward a right eye.

2. The sensing device of clause 1, wherein the first angle sensor comprises one or more arrays of angle sensors, and each angle sensor in the one or more arrays of angle sensors comprises an analyzer periodic structure that is offset from an input periodic structure by a different fraction of a predefined period.

3. The sensing device of clauses 1 or 2, wherein each input periodic structure and each analyzer periodic structure comprises at least one of a diffraction grating, a liquid crystal grating, a multi-modal interference device, an array of lenses, a phase grating, or a microelectromechanical system device.

4. The sensing device of any of clauses 1-3, wherein the first angle sensor comprises one or more arrays of angle sensors, and each angle sensor in the one or more arrays of angle sensors comprises an input periodic structure and a plurality of detectors.

5. The sensing device of any of clauses 1-4, wherein the first angle sensor comprises a plurality of angle sensors, and at least one angle sensor included in the plurality of angle sensors is associated with a larger dynamic range than at least one other angle sensor included in the plurality of angle sensors.

6. The sensing device of any of clauses 1-5, wherein the first angle sensor is configured to generate a first signal indicating an angle at which the first portion of light is projected toward the left eye, and the second angle sensor is configured to generate a second signal indicating an angle at which the second portion of light is projected toward the right eye.

7. The sensing device of any of clauses 1-6, wherein the first angle sensor is configured to generate a first signal indicating an optical flow associated with the first portion of light projected toward the left eye, and the second angle sensor is configured to generate a second signal indicating an optical flow associated with the light projected toward the right eye.

8. The sensing device of any of clauses 1-7, further comprising a bar, wherein the first angle sensor and the second angle sensor are mounted on the bar.

9. The sensing device of any of clauses 1-8, further comprising one or more first optical filters configured to filter the first portion of light to generate a first filtered portion of light, wherein the first angle sensor detects the first filtered portion of light, and one or more second optical filters configured to filter the second portion of light to generate a second filtered portion of light, wherein the second angle sensor detects the second filtered portion of light.

10. The sensing device of any of clauses 1-9, further comprising one or more first lenses that the first portion of light passes through prior to being detected by the first angle sensor, and one or more second lenses that the second portion of light passes through prior to being detected by the second angle sensor.

11. The sensing device of any of clauses 1-10, further comprising a first waveguide configured to guide the first portion of light toward the first angle sensor, and a second waveguide configured to guide the second portion of light toward the second angle sensor.

12. The sensing device of any of clauses 1-11, wherein the first portion of light is emitted by a first projector, the second portion of light is emitted by a second projector, and the first projector is movable with respect to the second projector in response at least one of mechanically-induced stress or thermally-induced stress.

13. In some embodiments, a display system comprises a first projector, a second projector, a first angle sensor configured to detect a first portion of light that is emitted by the first projector and projected toward a left eye, and a second angle sensor configured to detect a second portion of light that is emitted by the second projector and projected toward a right eye.

14. The display system of clause 13, further comprising a first waveguide configured to guide the first portion of light toward the first angle sensor, and a second waveguide configured to guide the second portion of light toward the second angle sensor.

15. The display system of clauses 13 or 14, wherein the first angle sensor is configured to generate a first signal indicating an angle at which the first portion of light is projected toward the left eye, and the second angle sensor is configured to generate a second signal indicating an angle at which the second portion of light is projected toward the right eye.

16. The display system of any of clauses 13-15, wherein the first angle sensor is configured to generate a first signal indicating an optical flow associated with the first portion of light projected toward the left eye, and the second angle sensor is configured to generate a second signal indicating an optical flow associated with the light projected toward the right eye.

17. The display system of any of clauses 13-16, further comprising one or more first lenses that the first portion of light passes through prior to being detected by the first angle sensor, and one or more second lenses that the second portion of light passes through prior to being detected by the second angle sensor.

18. The display system of any of clauses 13-17, wherein the display system comprises a head-mounted display.

19. In some embodiments, a method comprises determining, based on one or more signals from one or more first angle sensors, a first projection angle at which light is projected toward a left eye, determining, based on one or more signals from one or more second angle sensors, a second projection angle at which light is projected toward a right eye, computing a relative difference between the first projection angle and the second projection angle, and modifying at least one of the first projection angle or the second projection angle based on the relative difference.

20. The method of clause 19, wherein determining the first projection angle comprises subtracting out a first background, and determining the second projection angle comprises subtracting out a second background.

Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations are apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A sensing device comprising:
a first angle sensor configured to detect a first portion of light projected toward a left eye, wherein the first angle sensor comprises a plurality of angle sensors, and at least one angle sensor included in the plurality of angle sensors is associated with a larger dynamic range than at least one other angle sensor included in the plurality of angle sensors; and
a second angle sensor configured to detect a second portion of light projected toward a right eye.

2. The sensing device of claim 1, wherein the first angle sensor comprises one or more arrays of angle sensors, and each angle sensor in the one or more arrays of angle sensors comprises an analyzer periodic structure that is offset from an input periodic structure by a different fraction of a predefined period.

3. The sensing device of claim 2, wherein each input periodic structure and each analyzer periodic structure comprises at least one of a diffraction grating, a liquid crystal grating, a multi-modal interference device, an array of lenses, a phase grating, or a microelectromechanical system device.

4. The sensing device of claim 1, wherein the first angle sensor comprises one or more arrays of angle sensors, and each angle sensor in the one or more arrays of angle sensors comprises an input periodic structure and a plurality of detectors.

5. The sensing device of claim 1, wherein the second angle sensor comprises a second plurality of angle sensors, and at least one angle sensor included in the second plurality of angle sensors is associated with a larger dynamic range than at least one other angle sensor included in the second plurality of angle sensors.

6. The sensing device of claim 1, wherein the first angle sensor is configured to generate a first signal indicating an angle at which the first portion of light is projected toward the left eye, and the second angle sensor is configured to generate a second signal indicating an angle at which the second portion of light is projected toward the right eye.

7. The sensing device of claim 1, wherein the first angle sensor is configured to generate a first signal indicating an optical flow associated with the first portion of light projected toward the left eye, and the second angle sensor is configured to generate a second signal indicating an optical flow associated with the light projected toward the right eye.

8. The sensing device of claim 1, further comprising a bar, wherein the first angle sensor and the second angle sensor are mounted on the bar.

9. The sensing device of claim 1, further comprising:
one or more first optical filters configured to filter the first portion of light to generate a first filtered portion of light, wherein the first angle sensor detects the first filtered portion of light; and
one or more second optical filters configured to filter the second portion of light to generate a second filtered portion of light, wherein the second angle sensor detects the second filtered portion of light.

10. The sensing device of claim 1, further comprising:
one or more first lenses that the first portion of light passes through prior to being detected by the first angle sensor; and
one or more second lenses that the second portion of light passes through prior to being detected by the second angle sensor.

11. The sensing device of claim 1, further comprising:
a first waveguide configured to guide the first portion of light toward the first angle sensor; and
a second waveguide configured to guide the second portion of light toward the second angle sensor.

12. The sensing device of claim 1, wherein the first portion of light is emitted by a first projector, the second portion of light is emitted by a second projector, and the first projector is movable with respect to the second projector in response at least one of mechanically-induced stress or thermally-induced stress.

13. A display system, comprising:
a first projector;
a second projector;
a first angle sensor configured to detect a first portion of light that is emitted by the first projector and projected toward a left eye, wherein the first angle sensor comprises a plurality of angle sensors, and at least one angle sensor included in the plurality of angle sensors is associated with a larger dynamic range than at least one other angle sensor included in the plurality of angle sensors; and
a second angle sensor configured to detect a second portion of light that is emitted by the second projector and projected toward a right eye.

14. The display system of claim 13, further comprising:
a first waveguide configured to guide the first portion of light toward the first angle sensor; and
a second waveguide configured to guide the second portion of light toward the second angle sensor.

15. The display system of claim 13, wherein the first angle sensor is configured to generate a first signal indicating an angle at which the first portion of light is projected toward the left eye, and the second angle sensor is configured to generate a second signal indicating an angle at which the second portion of light is projected toward the right eye.

16. The display system of claim 13, wherein the first angle sensor is configured to generate a first signal indicating an optical flow associated with the first portion of light projected toward the left eye, and the second angle sensor is configured to generate a second signal indicating an optical flow associated with the light projected toward the right eye.

17. The display system of claim 13, further comprising:
one or more first lenses that the first portion of light passes through prior to being detected by the first angle sensor; and one or more second lenses that the second portion of light passes through prior to being detected by the second angle sensor.

18. The display system of claim 13, wherein the display system comprises a head-mounted display.

19. A method comprising:

determining, based on one or more signals from one or more first angle sensors, a first projection angle at which light is projected toward a left eye, wherein determining the first projection angle comprises subtracting out a first background;

determining, based on one or more signals from one or more second angle sensors, a second projection angle at which light is projected toward a right eye;

computing a relative difference between the first projection angle and the second projection angle; and modifying at least one of the first projection angle or the second projection angle based on the relative difference.

20. The method of claim 19, wherein:

determining the second projection angle comprises subtracting out a second background.

\* \* \* \* \*